United States Patent
Borthakur et al.

(10) Patent No.: US 11,030,242 B1
(45) Date of Patent: Jun. 8, 2021

(54) INDEXING AND QUERYING SEMI-STRUCTURED DOCUMENTS USING A KEY-VALUE STORE

(71) Applicant: Rockset, Inc., San Mateo, CA (US)

(72) Inventors: Dhruba Borthakur, Sunnyvale, CA (US); Venkat Venkataramani, Palo Alto, CA (US); Igor Canadi, San Francisco, CA (US); Tudor Bosman, Hayward, CA (US)

(73) Assignee: Rockset, Inc., San Mateo, CA (US)

( * ) Notice: Subject to any disclaimer, the term of this patent is extended or adjusted under 35 U.S.C. 154(b) by 81 days.

(21) Appl. No.: 16/160,477

(22) Filed: Oct. 15, 2018

(51) Int. Cl.
*G06F 16/81* (2019.01)
*G06F 16/93* (2019.01)
*G06F 16/835* (2019.01)
*G06F 16/951* (2019.01)

(52) U.S. Cl.
CPC ............ *G06F 16/81* (2019.01); *G06F 16/835* (2019.01); *G06F 16/93* (2019.01); *G06F 16/951* (2019.01)

(58) Field of Classification Search
CPC ..... G06F 16/81; G06F 16/835; G06F 16/8358
See application file for complete search history.

(56) References Cited

U.S. PATENT DOCUMENTS

| | | | | |
|---|---|---|---|---|
| 9,471,711 | B2 * | 10/2016 | Abadi | G06F 16/90335 |
| 9,507,848 | B1 * | 11/2016 | Li | G06F 16/31 |
| 2004/0044659 | A1 * | 3/2004 | Judd | G06F 16/334 |
| 2004/0139091 | A1 * | 7/2004 | Shin | G06F 16/81 |
| 2009/0006314 | A1 * | 1/2009 | Balmin | G06F 16/835 |
| 2009/0112858 | A1 * | 4/2009 | Zhang | G06F 16/81 |
| 2010/0211572 | A1 * | 8/2010 | Beyer | G06F 16/951 707/742 |
| 2011/0066937 | A1 * | 3/2011 | Loeser | G06F 16/81 715/241 |
| 2012/0215785 | A1 * | 8/2012 | Singh | G06F 16/9535 707/741 |
| 2013/0166568 | A1 * | 6/2013 | Binkert | G06F 16/86 707/741 |
| 2015/0205885 | A1 * | 7/2015 | Zhou | G06F 16/2282 707/742 |

(Continued)

OTHER PUBLICATIONS

Mongodb, "MongoDB Atlas," 6 pages, [Online] [Retrieved Mar. 7, 2019], Retrieved from the internet <URL: www.mongodb.com>.

(Continued)

*Primary Examiner* — William Spieler
(74) *Attorney, Agent, or Firm* — Fenwick & West LLP (57) ABSTRACT

A search system processes queries for accessing information stored in documents. A document comprises fields. The search system stores a plurality of indexes in a key-value store. Each index comprises key-value pairs. A key of a key-value pair is obtained by combining field data describing a field of a document. The value of each field is stored as an individual key-value in the key-value store. The search system receives a query requesting information stored in documents and specifying a search criteria. The search system builds a key-expression based on the search criteria and uses one or more indexes to find key-value pairs matching the key-expression. The search system finds the requested information based on the matching key-value pairs and provides the requested information to the query source.

20 Claims, 6 Drawing Sheets

(56) References Cited

U.S. PATENT DOCUMENTS

| | | | | |
|---|---|---|---|---|
| 2015/0261882 A1* | 9/2015 | Roberts | .................. | G06F 16/258 707/756 |
| 2015/0356175 A1* | 12/2015 | Flynn | .................... | G06F 16/901 707/752 |
| 2015/0370917 A1* | 12/2015 | Vandiver | .................. | G06F 16/86 707/756 |
| 2016/0321308 A1* | 11/2016 | Brinnand | .............. | G06F 16/951 |
| 2019/0340273 A1* | 11/2019 | Raman | .................. | G06F 16/903 |

OTHER PUBLICATIONS

Percona Live, "RocksDB for the Cloud," 4 pages, [Online] [Retrieved Mar. 7, 2019], Retrieved from the internet <URL: www.percona.com/live/17/sessions/rocksdb-cloud>.

Rocksdb, "A persistent key-value store for fast storage environments," 6 pages, [Online] [Retrieved Mar. 7, 2019], Retrieved from the internet <URL: rocksdb.org>.

Wikipedia, "Amazon Redshift," 2 pages, [Online] [Retrieved Mar. 7, 2019], Retrieved from the internet <URL: en.wikipedia.org/wiki/Amazon_Redshift>.

Wikipedia, "Apache Lucene," 4 pages, [Online] [Retrieved Mar. 7, 2019], Retrieved from the internet <URL:en.wikipedia.org/wiki/Apache_Lucene>.

Wikipedia, "Elasticsearch," 4 pages, [Online] [Retrieved Mar. 7, 2019], Retrieved from the internet <URL: en.wikipedia.org/wiki/Elasticsearch>.

Wikipedia, "Log-structured merge-tree," 2 pages, [Online] [Retrieved Mar. 7, 2019], Retrieved from the internet <URL: en.wikipedia.org/wiki/Log-structured_merge-tree>.

Wikipedia, "Search engine indexing," 10 pages, [Online] [Retrieved Mar. 7, 2019], Retrieved from the internet <URL:en.wikipedia.org/wiki/Search_engine_indexing>.

Wikipedia, "Teradata," 9 pages, [Online] [Retrieved Mar. 7, 2019], Retrieved from the internet <URL: en.wikipedia.org/wiki/Teradata>.

* cited by examiner

INDEXING AND QUERYING SEMI-STRUCTURED DOCUMENTS USING A KEY-VALUE STORE

BACKGROUND

This disclosure relates generally to indexing of documents for efficient querying of information stored in the documents, and more specifically to indexing semi-structured documents using a key-value store.

Enterprises often use databases, for example, relational databases for searching across structured data. Databases require data to be stored using a particular schema. However a significant amount of machine generated data, for example, unstructured data does not conform to such schemas and is therefore not stored in such databases. Search engines are used to perform searches across unstructured data. However, there is increase in use of semi-structured data that does not conform to a rigid schema but has more structure compared to unstructured data. Examples of such semi-structured data includes XML (extensible markup language) data and data represented using JSON (JavaScript Object Notation) format. Conventional databases are unable to effectively process semi-structured data since this data does not conform to a rigid schema. Furthermore, conventional search engines do not effectively process semi-structured data since they do not exploit the structure available in the semi-structured data. As a result, conventional techniques for performing searches across semi-structured data either provide poor quality search results or perform the search inefficiently.

SUMMARY

The above and other issues are addressed by a computer-implemented method, computer system, and computer readable storage medium for processing search queries. Embodiments of the method store a plurality of indexes based on documents. Each document comprises one or more fields. Each index comprises key-value pairs stored in a key-value store. The plurality of indexes comprise: a document index configured to identify documents matching a given criteria based on field information, a field index configured to access fields of a particular document, and a columnar index configured to access aggregate values associated with fields. A document comprising one or more fields is received. Each field of the document has a field name, a field value, and a field type. Each field is converted into a set of key-value pairs and each of these key-value pairs are stored using individual keys in a key-value store. The plurality of indexes are updated based on the received document. A query requesting information stored in the plurality of documents is received from a query source. The query specifies a search criteria. A key-expression is generated based on the specified search criteria. The requested information is accessed by identifying key-value pairs matching the key-expression in one or more indexes. The accessed information is sent to the query source.

Embodiments of a computer readable storage medium store instructions for performing the steps of the above method. Embodiments of the computer system comprise one or more computer processors and a computer readable storage medium store instructions for performing the steps of the above method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The teachings of the embodiments can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
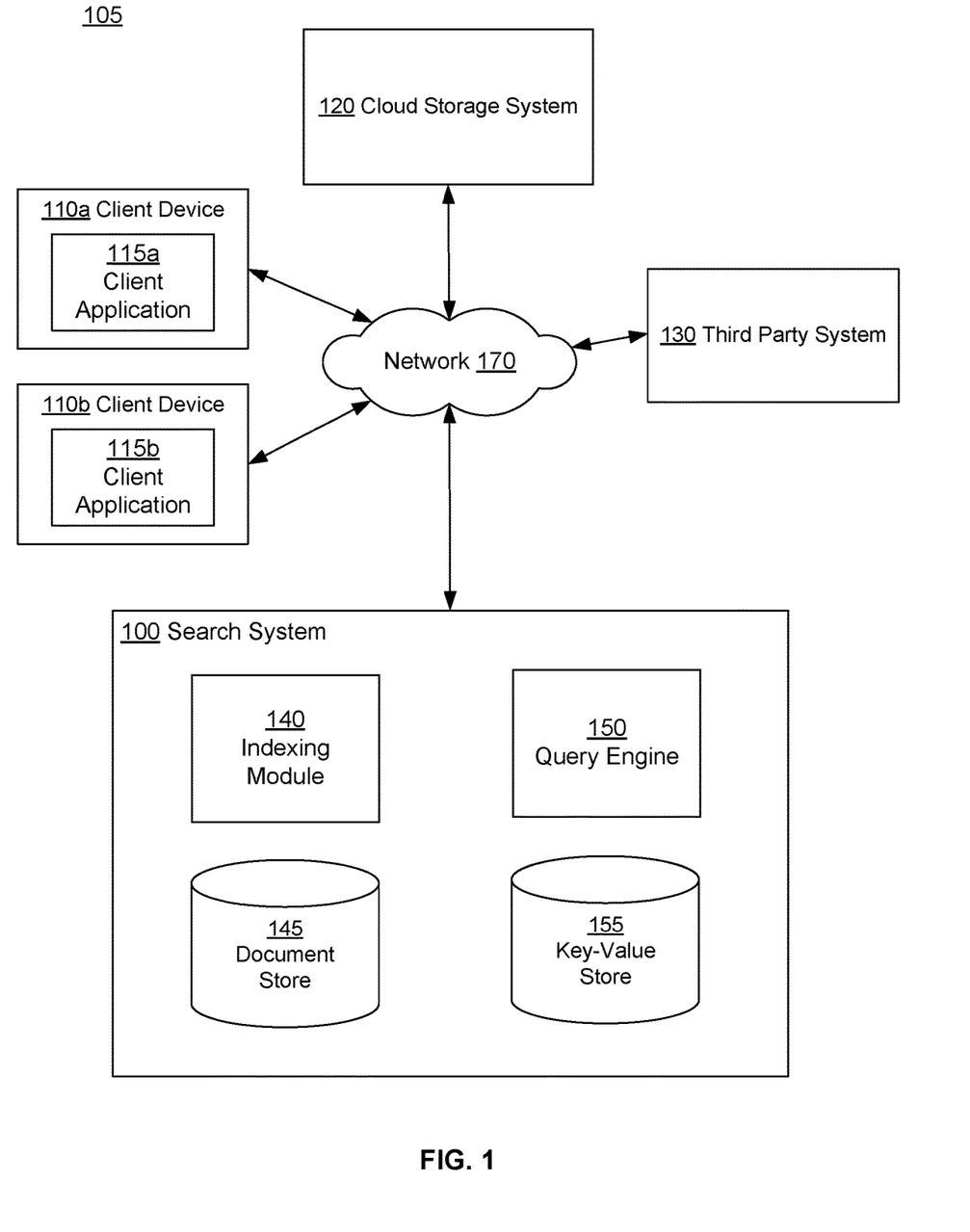
FIG. 1 is a block diagram of a system environment in which a search system operates, in accordance with an embodiment.

FIG. 1 is a block diagram of a system environment 105 in which a search system operates, in accordance with an embodiment. The system environment provides schema agnostic data indexing for semi-structured data using a key-value store. The system environment 105 comprises the search system 100, one or more client devices 110, a cloud storage system 120, one or more third party systems 130, and a network 170. Other embodiments may have more of fewer systems within the system environment 105. Functionality indicated as being performed by a particular system or a module within a system may be performed by a different system or by a different module than that indicated herein.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

The cloud storage system 120 comprises one or more servers that allow third party systems 130 to store data remotely. Accordingly, the cloud storage system 120 provides cloud storage that represents shared storage that can be accessed by systems, for example, third party systems 130, via a network 170 if the systems have permission to access the data. The cloud storage system 120 grants permission to a system to access data based on credentials provided by the system. Examples of cloud storage systems 120 include AMAZON WEB SERVICES (AWS), GOOGLE CLOUD STORAGE (GCS), MICROSOFT AZURE, and so on. These are examples of public cloud storage systems that allow access to users independent of the organization that they belong to. In some embodiments, the cloud storage system 120 represents a private cloud of an organization (or an enterprise or a corporate entity). A private cloud may be set up inside a firewall of the organization. Access to a private cloud of an organization is limited to users within the organization. Both private clouds and public clouds act as shared storage for all computer systems that have access to the cloud storage.

The third party systems 130 generate semi-structured data that is represented as semi-structured documents. A third party system 130 may store documents locally in a storage of the third party system 130 or in the cloud storage system 120. The third party system 130 may provide the search system 100 with access to the documents stored in the cloud storage system 120. The search system 100 obtains the documents associated with the third party system 130 from the cloud storage system 120. The search system 100 creates indexes based on the retrieved documents to allow efficient searches using the documents. Although the system environment 105 shown in FIG. 1 receives documents from a cloud storage system, other embodiments can process data received from other sources. For example, the search system 100 may subscribe to streams of records from a streaming platform such as KAFKA. The search system accordingly receives records from the streaming platform, stores the records received in the document store 145, and perform indexing and searching on the received records.

The system environment 105 may include multiple client devices 110. A client device 110 is a computing device such as a personal computer (PC), a desktop computer, a laptop computer, a notebook, or a tablet PC. The client device 110 can also be a personal digital assistant (PDA), mobile telephone, smartphone, wearable device, etc. The client device 110 can also be a server or workstation within an enterprise datacenter. The client device executes a client application 115 for interacting with the search system 100, for example, a browser. Although, FIG. 1 shows two client devices, the system environment 105 can include many more client devices 110.

The search system 100 comprises modules including an indexing module 140, a document store 145, a query engine 150, and a key-value store 155. Other embodiments can include more or fewer modules in the search system 100.

The search system 100 performs searches across semi-structured data although the techniques disclosed herein can be used for structured and unstructured data. Semi-structured data is a form of structured data that does not conform to a formal structure of data, for example, schemas of relational databases. Semi-structured data contains metadata such as tags or other markers to separate various elements of the documents and enforce hierarchies of records and fields within the document. Semi-structured data can be represented using a particular type of format, for example, hypertext markup language (HTML), the extensible markup language (XML), JAVASCRIPT object notation (JSON), PDF, MICROSOFT WORD, documents based on comma separated variable (CSV), tab-delimited text files, and so on. A semi-structured document is a document that stores semi-structured data.

A semi-structured document includes one or more fields. A field may also be referred to as an attribute. In an embodiment, a semi-structured document is represented as key-value pairs. A field comprises field data, for example, a field name, a field value, and a field type. For example, a semi-structured document representing data describing a person may include a field with name "first_name", a field value "Jack" and field type "string".

Different semi-structured documents may have different fields. Furthermore, a field with the same name in two different semi-structured documents may store data of different types. For example, a document D1 may have fields a1 and a2 whereas document D2 may have fields a1 and a3. Furthermore, the field a1 in document D1 may store data of type integer whereas field a1 in document D2 may store data of type string.

The search system 100 receives documents from various sources, for example, from cloud storage systems 120 or third party systems 130 and stores the received documents in the document store 145. The search system 100 may also receive documents sent by applications executing on systems such as client devices 110. The search system 100 is configured to automatically sync data from various external sources such as cloud based systems and continuously index them in the key-value store 155. The search queries processed by the query engine 150 return the appropriate results available in the key-value stores when the search query is executed. For example, a query that requests documents matching a search criteria may be received at time T1 and again at time T2. The query execution at time T1 may return a set S1 of documents. However, if the search system 100 receives additional documents from a cloud storage system 120 between the time T1 and time T2, the execution of the query at time T2 may return a set S2 that reflects any matching documents received between the time T1 and T2.

The indexing module 140 creates indexes used by the query engine 150 for performing efficient searches for data stored in the documents. The indexing module 140 stores the generated indexes in the key-value store 155. The indexing module 140 receives semi-structured documents comprising fields and adds key-value pairs based on fields of the documents in the key-value store 155. In an embodiment, a key is represented as a string. A key-value pair stored in the key-value store 155 is also referred to herein as a record. The key-value store 155 stores a plurality of indexes based on the documents received. In an embodiment, the key-value store 155 stores key-value pairs in a sorted order of keys, for example, alphabetically sorted order.

The query engine 150 receives search queries from client applications 115 executing on client device 110s. The query engine 150 processes a received search query using indexes stored in the key-value store 155 and returns the search results to the client application 115 that sent the search query.

The key-value store 155 allows the search system 100 to store semi-structured data that does not conform to a rigid schema. For example, documents with different fields can be added to the key-value store by splitting each document into individual key-value pairs, each key-value pair representing a field. In contrast, a relational database requires all records to have the same structure to be able to be added to a table. Furthermore, the key-value store 155 allows efficient searches for keys, for example, keys matching a given prefix. The indexing module 140 creates indexes having different key structures that allow different types of searches to be performed efficiently. As a result the search system 100 is able to perform more efficient searches than a search engine that uses a simple inverted index that maps keywords to documents.

The search system 100 creates different types of indexes to perform different types of queries. Examples of different types of queries include: query for documents that have fields having a particular name and particular value, query for fields of a given document having a document identifier, query to aggregate data of fields matching a given criteria, and so on. Each index created by the search system 100 combines field data and/or document identifiers in a particular order to generate key-value pairs for the index. The order in which field data and document identifier are combined for an index allow efficient execution of a particular type(s) of queries.

Assume that an index I1 combines values associated with the field in the following order: field name, field type, and document identifier to obtain keys. This index is configured to allow efficient access to all occurrences of fields having a particular name and optionally a field type. For example, assume that the query engine 150 needs to search for all documents with field name "A1" independent of the field type and the document. The query engine 150 generates a key-expression "A1" and searches for all key-value pairs having a prefix matching the generated key-expression. This prefix search matches all occurrences of field "A1" independent of the field type and document.

As another example, assume that the query engine 150 needs to access all occurrences of fields having field name "A1" and field type T1. The query engine 150 generates a key expression that combines value "A1" and "T1" and searches for all key-value pairs having a prefix matching the generated key-expression. This prefix search returns all occurrences of field "A1" with field type "T1". As another example, assume that the query engine 150 needs to access the field having field name "A1" and field type T1, from a specific document having identifier "ID1". The query engine generates a key expression that combines the strings "A1", "T1", and "ID1" and searches for the key-value pair having a prefix matching the generated key-expression.

Another index, for example, index I2 may combine the field data and document identifier values in a different order. For example, index I2 may combine field name, field value, and document identifier in this particular order to obtain keys of key-value pairs. The query engine 150 may use index I2 to search for all documents that have a particular value "V1" of a particular field "A1". The query engine 150 performs such a search by generating a key-expression by combining the field name "A1" and the field value "V1" and performing a prefix search for the generated key-expression in the index I2. The prefix search would match all occurrences of fields with name "A1" and value "V1" independent of the document identifier.

The network 170 enables communications between various systems within the system environment 105, for example, communications between the client device 110 and the search system 100, communications between the third party system 130 and the cloud storage system 120, and so on. In one embodiment, the network uses standard communications technologies and/or protocols. The data exchanged over the network can be represented using technologies and/or formats including, the HTML, the XML, JSON, and so on.

System Architecture

Figure 2:
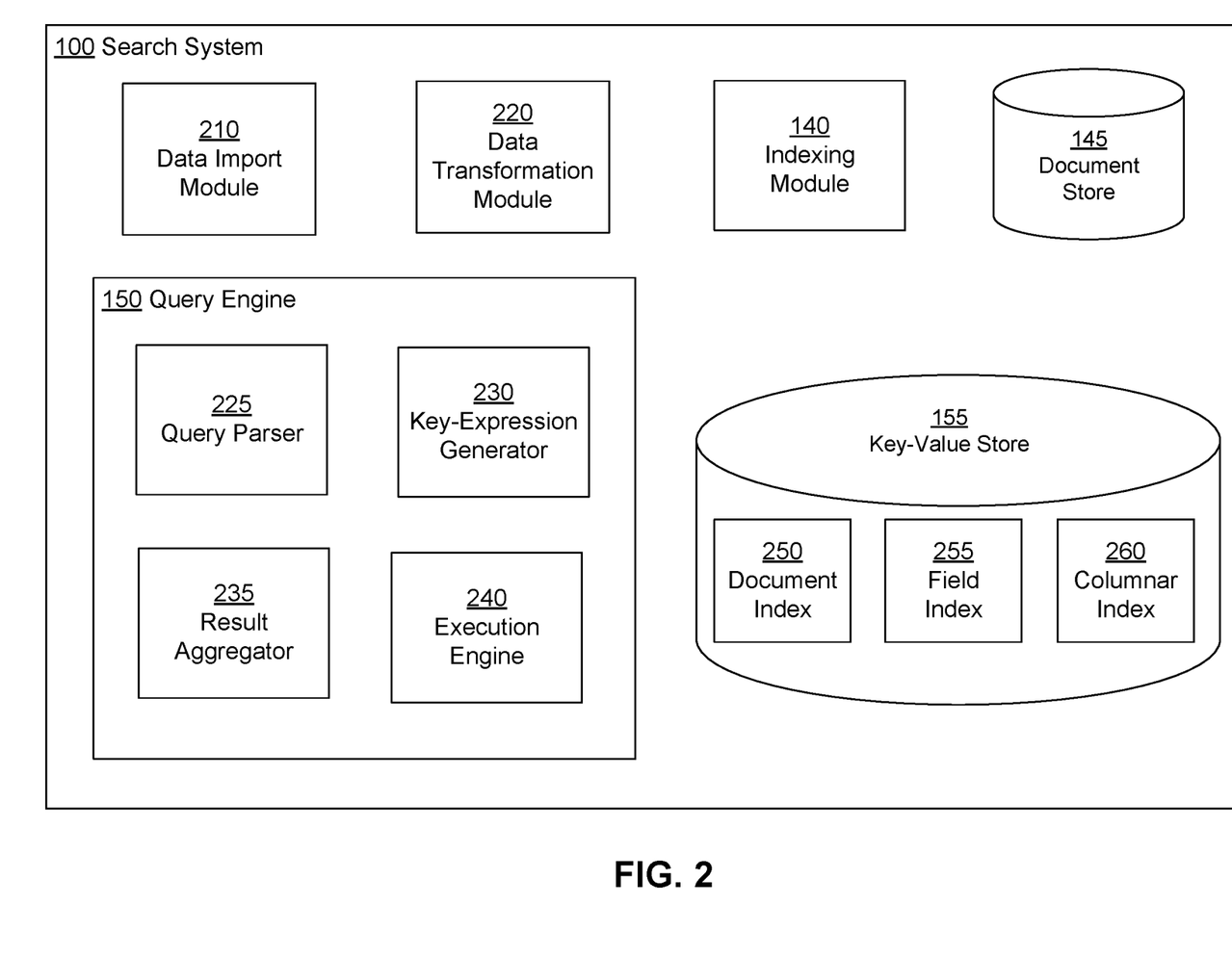
FIG. 2 shows the system architecture of a search system, in accordance with an embodiment.

FIG. 2 shows the system architecture of a search system, in accordance with an embodiment. The search system 100 comprises a data import module 210, a data transformation module 220, the indexing module 140, the document store 145, the key-value store 155, and the query engine 150. Other embodiments of a search system 100 may include more or fewer modules.

The data import module 210 interfaces with systems that act as sources of documents, for example, the cloud storage systems 120. The data import module 210 may import structured data, unstructured data or semi-structured data. In an embodiment, the data import module 210 uses login credentials to create a session with a cloud storage system 120. The login credential may be received from a third party system 130 that stores documents in the cloud storage system 120. The data import module 210 uses the session to retrieve the documents of the third party system 130 from cloud storage system 120. In an embodiment, the data import module 210 imports multiple documents in parallel using multiple processors. The data import module 210 scales the number of processors used for importing the documents based on the number of documents that need to be imported.

In an embodiment, each document received by the data import module 210 has a document identifier. The document identifier may be stored as a field of the document. The document identifier is provided by the source of the document, for example, by a third party system 130 that provided the document.

The document store 145 stores the documents imported by the data import module 210. The document store 145 acts as a staging area for documents for further processing by the search system 100. In an embodiment, the document store 145 is implemented as a distributed log store that stores logs across a plurality of systems. New documents received by the search system 100 are added to the end of a log. Adding documents to the end of a log is efficient compared to inserting documents in the middle of a file. This is so because adding data in the middle of a file may require moving of existing data in addition to writing the data that was received. In contrast, appending data at the end of a log file can be performed simply by writing the data without requiring any additional data movement. The documents stored in a log are ordered based on the time that each document was added to the log.

The data transformation module 220 transforms documents stored in the document store 145 that may be represented using various formats to a canonical format, i.e., a standardized format for example, JSON format or XML format. In an embodiment, the canonical format represents fields using key-value pairs. For example, the data transformation module 220 may use JSON format as a canonical format and transform documents represented in PDF format or WORD format to JSON format.

In an embodiment, the data transformation module 220 transforms a document from a given format to the canonical format by transforming each field of the document. As an example, an input document may be represented using XML format that comprises various tags. The data transformation module 220 parses the XML document to identify each XML tag of the document and generates a key-value pair corresponding to the XML tag. For example, the key of the key-value pair may be generated based on the name of the XML tag and the value of the key-value pair may be generated based on the data of the XML tag. The data transformation module 220 adds the generated key-value pairs to the transformed document. The conversion of documents to a canonical format simplifies operations such as indexing of the documents since the indexing module 140 need only process a single canonical format.

In some embodiments, the data transformation module 220 transforms the data of a document to anonymize the data, for example, by replacing personally identifiable information with other data. Accordingly, fields comprising email addresses may be modified by replacing the email address with a different string or with a numeric hash value. Similarly, fields storing values such as social security numbers or credit card numbers are modified to store a different value. In these embodiments, even if an input document is available in the canonical format, the data transformation module 220 transforms the data for anonymizing certain fields.

The indexing module 140 processes the transformed documents and adds key-value pairs based on field data extracted from the transformed documents to multiple indexes that are stored in the key-value store 155. The key-value store 155 stores the key-value pairs in a sorted order, for example, in order of alphabetically sorted keys. Each index is associated with an order in which values of field data and document identifier are combined to obtain the keys of the key-value pairs added to the index. The query engine 150 generates key-expressions based on the order in which values are combined and uses the key-expressions to perform prefix searches for specific key-value pairs of that index.

In an embodiment, the key-value store 155 includes a document index 250 configured to allow efficient processing of queries that determine documents that match a given criteria based on field data, a field index 255 configured to allow efficient processing of queries that access fields of a given document, and a columnar index 260 configured to allow efficient processing of queries that aggregate fields of documents. The search system may use multiple indexes to efficiently process a query, for example, both the document index and field index may be used to access a field "A1" from all documents that match a specified criteria based on field "A2". In an embodiment, the data import module 210 receives a request to store a modified version of a document that was previously imported.

Each index comprises key-value pairs that are stored in the key-value store 155. In an embodiment, the keys corresponding to a particular index include a sub-string that identifies the index. Accordingly, the keys corresponding to the key-value pairs of the document index 250 include a document index identifier, for example, the string "I", the keys corresponding to the key-value pairs of the field index 255 include a field index identifier, for example, string "S", and the keys corresponding to the key-value pairs of the columnar index 260 include a columnar index identifier, for example, string "D".

The document index 250 is an inverted index that allows accessing documents that satisfy certain criteria based on field data. Each key of a key-value pair of the document index 250 is generated by concatenating the following values in the following order: the document index identifier, the field name, the field type, the field value, and the document identifier. Other embodiments may generated the keys by concatenating fewer elements than those listed herein. Furthermore, the elements listed above may be concatenated in an order different from the order listed above to generate the key for the document index 250. For example, the order of the field data may be changed. However, the for the document index 250, the field data occurs before the document identifier in the keys. The value of the key-value pair for the document index 250 is empty.

The field index 255 is a forward index that contiguously stores all fields of a document. Each key of a key-value pair of the field index 255 is generated by concatenating the following values in the following order: field index identifier, the document identifier, and the field name. Other embodiments may generate the keys by concatenating fewer elements than those listed herein. Furthermore, the elements listed above may be concatenated in an order different from the order listed above to obtain the key for the field index 255. The value of the key-value pair for the field index 255 is the field value.

The columnar index 260 stores data in columnar fashion by contiguously storing values of the same field across different documents. Each key of a key-value pair of the columnar index 260 is generated by concatenating the following values in the following order: the columnar index identifier, the field name, the field type, and the document identifier. Other embodiments may generate the keys by concatenating fewer elements than those listed herein. Furthermore, the elements listed above may be concatenated in an order different from the order listed above to obtain the key for the columnar index 260. The value of the key-value pair for the columnar index 260 is the field value.

In an embodiment, the key-value store 155 supports various APIs (application programming interfaces) that allow other modules or systems to interact with the key-value store 155. For example, the key-value store 155 supports a seek( ) and a get( ) API. The seek( ) API takes as input a string representing a prefix of keys and positions a read cursor to the first key in the key-value store that has the closest prefix to the input string. The seek( ) operation provides an efficient mechanism to access the appropriate keys in a key-value store. The key-value store stores the key-value pairs in a sorted order of the keys, for example, sorted in a lexicographical, alphabetical, or any other known and predetermined order. Since the key-value pairs are stored in a sorted order, the seek( ) operation is performed using an efficient search technique such as binary search to efficiently locate the matching key. Other embodiments store the sorted key-value pairs using specialized data structures that allow efficient access to values matching a given criteria. A call to the get( ) API following the seek( ) call retrieves the key-value pair at the read cursor and increments the read cursor and positions the read cursor on the next key-value pair. Each subsequent call to the get( ) API returns the key-value pair at the cursor and positions the read cursor on the next key-value pair. Since the key-value store 155 stores keys in a sorted order, the seek( ) and the get( ) APIs can be used to retrieve all keys that match a given prefix expression.

In an embodiment, a document comprises a variable length field. The search system 100 determines a fixed length value representing a location of the variable length field. The search system 100 stores the fixed length value in the key-value store instead of the value of the variable length field. Storing fixed-length data values in the key-value store allows the values to be updated efficiently, without requiring data movement. This is so because updating a variable length field from an old value to a new value may require movement of data to make room for the new value if the new value occupies more space than is currently available for storing the old value.

The query engine 150 receives search queries and processes them to identify matching data. The query engine 150 comprises a query parser 225, a key expression generator 230, a result aggregator 235, and an execution engine 240. Other embodiments of the query engine 150 may include more or fewer modules.

The query parser 225 parses a received query to determine various components of the query. The query parser 225 generates a data structure representing the query. The generated data structure allows efficient access to information describing the query. For example, the key-expression generator 230 may access the generated data structure to determine the search criteria of the query. In an embodiment, the queries processed by the search system 100 are based on the structured query language (SQL).

The key expression generator 230 generates an expression based on the parsed query for accessing key-value store 155. Each index is associated with a particular order in which field data is combined to generate keys for the index. The key expression generator 230 generates expressions by combining field data and/or document identifiers in the order associated with an index to access data stored in the index.

The execution engine 240 executes the query. In an embodiment, the query engine 150 generates an execution plan corresponding to a query and the execution engine 240 executes the execution plan. The result aggregator 235 aggregates the results of the query and optionally ranks them results.

Processes

Figure 3:
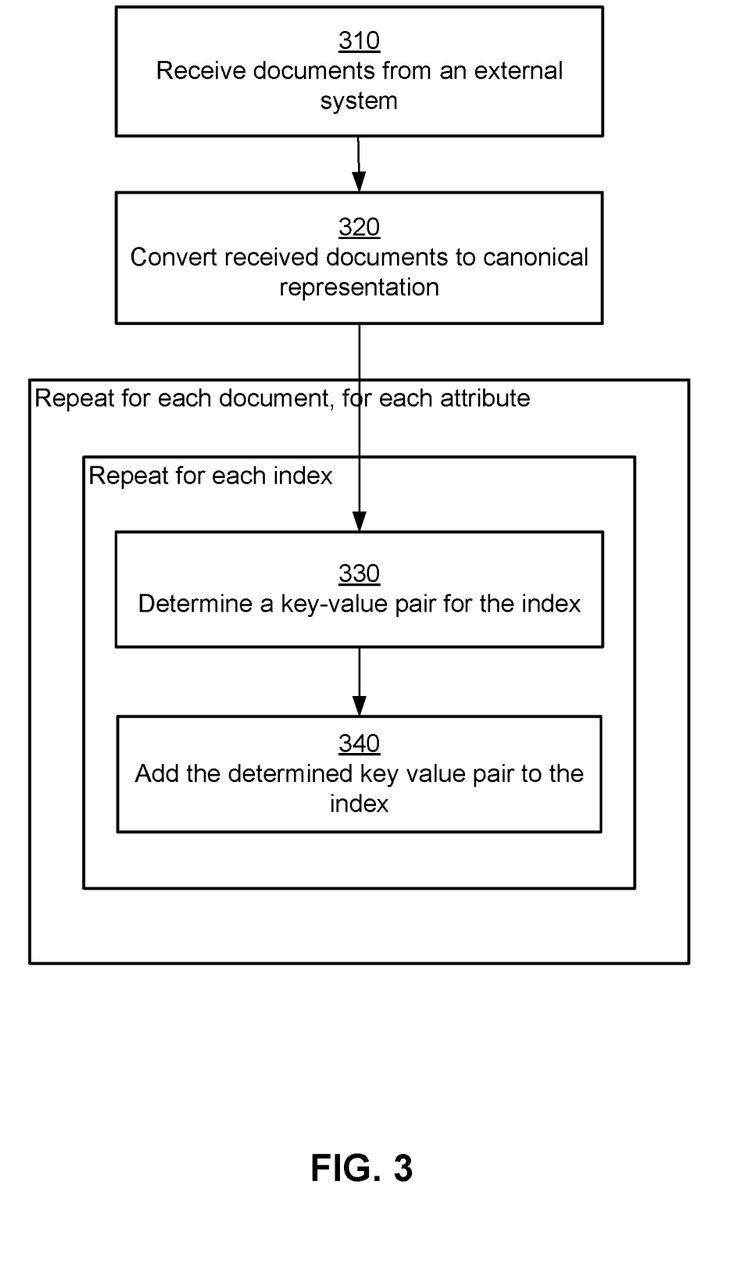
FIG. 3 is a flowchart of the process for building indexes for efficient execution of queries, in accordance with an embodiment.
Figure 4:
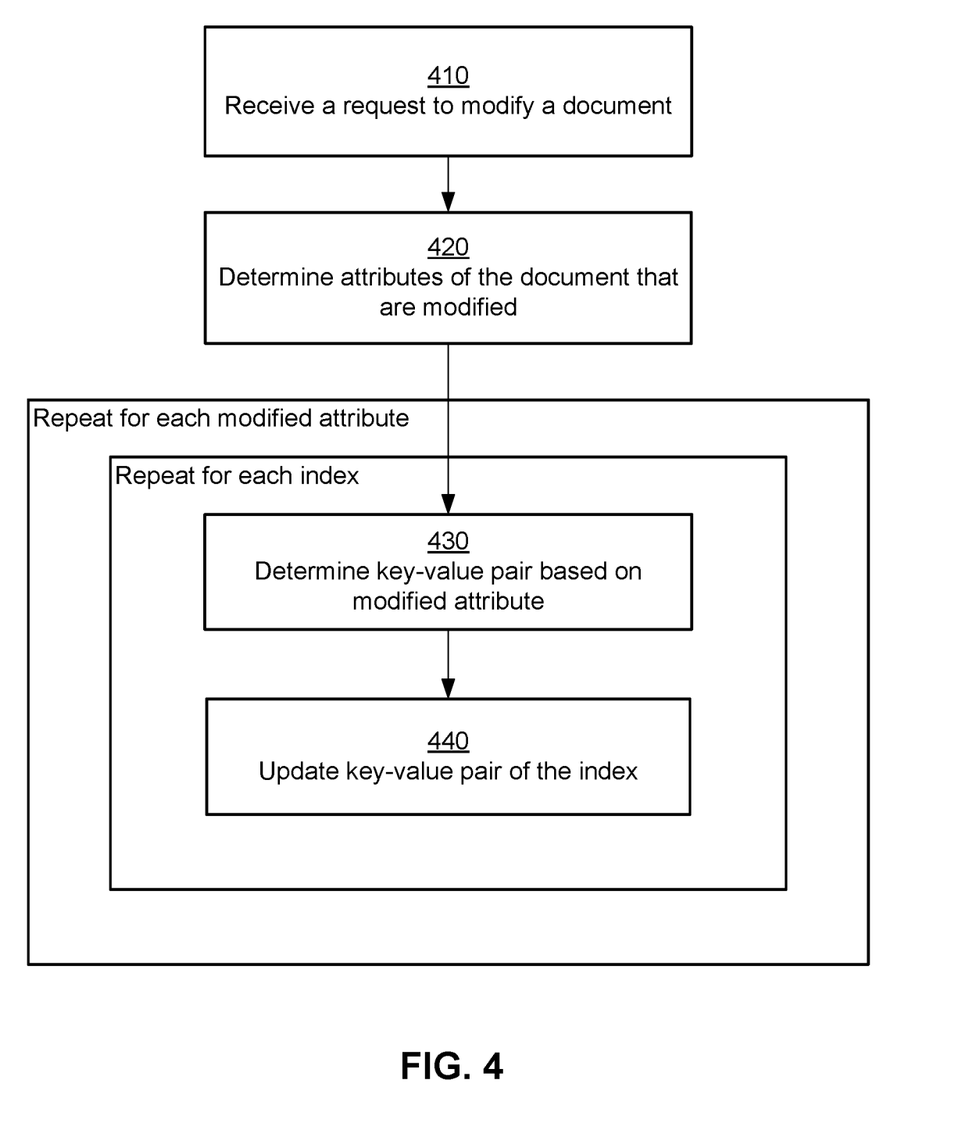
FIG. 4 shows a flowchart of the process for updating indexes based on modifications to documents, in accordance with an embodiment.
Figure 5:
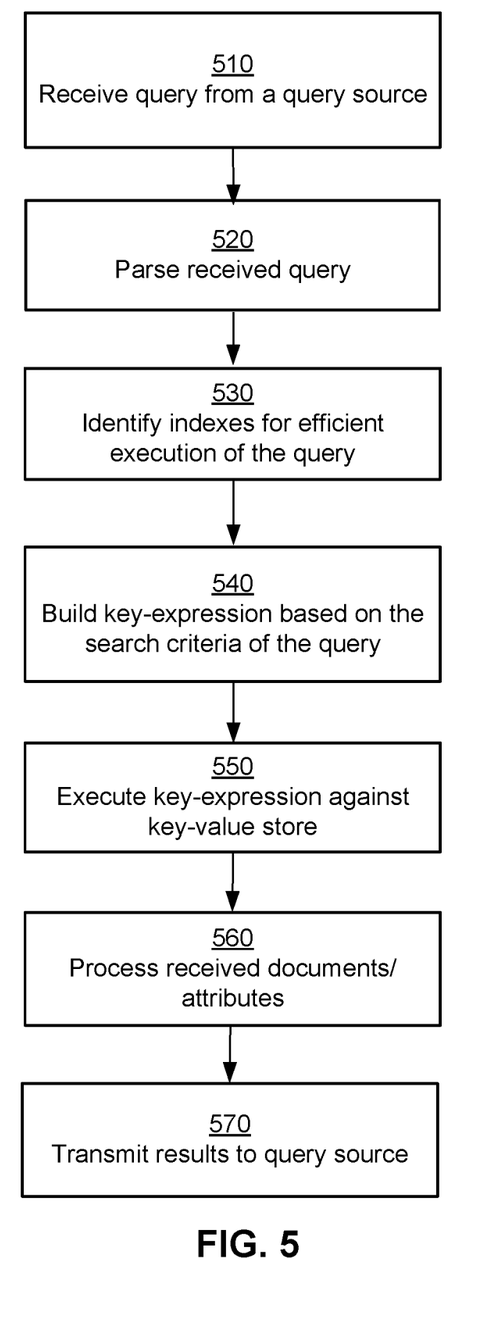
FIG. 5 shows a flowchart of the process for executing queries using the indexes, in accordance with an embodiment.

FIGS. 3-5 describe various processes associated with the search system 100. The steps shown in these processes can be executed in an order different from those shown in the flowcharts. Furthermore, various steps can be executed by module other than those indicated herein.

FIG. 3 is a flowchart of the process of building indexes for efficient execution of queries, in accordance with an embodiment. The search system 100 receives 310 one or more documents from an external system, for example, a cloud storage system 120 or from a third party system 130. The data transformation module 220 converts 320 the received documents to a canonical representation, for example, a JSON representation.

The search system 100 repeats steps 330 and 340 for each document, for each field of the document, and for each index. These steps add key-value pairs based on field data of the received documents to the different indexes. The indexing module 140 generates 330 a key-value pair for each field of a document and for a particular index. The indexing module 140 adds 340 the generated key-value pair to the particular index.

The indexing module 140 generates a key for the document index 250 by combining the following values in the following order: field name, the field type, the field value, and a document identifier identifying the document. The indexing module 140 stores an empty value or any dummy value as the value of the key-value pair added to the document index 250. The indexing module 140 generates the key for the field index 255 by combining the following values in the following order: the document identifier and the field name. The indexing module 140 stores the field value as the value of the key-value pair added to the field index 255. The indexing module 140 generates a key for the columnar index 260 by combining the following values in the following order: field name, the field type, and the document identifier. The indexing module 140 stores the field value as the value of the key-value pair added to the columnar index 260.

FIG. 4 shows a flowchart of the process for updating indexes based on modifications to documents, according to an embodiment.

The indexing module 140 receives 410 a modified document corresponding to an original document that was previously indexed. The modified document includes one or more fields that are different from a previous version of the document that was received and indexed. There may be one or more field of the modified documents that are identical to the corresponding fields of the original document.

In an embodiment, the search system 100 determines that a document received represents a modified version of a document received previously using a version number provided with the document. The version number may be stored as a field of the document. The indexing module 140 accesses the key-value store 155 to retrieve the version of the document that was previously stored and compares the version with the version of the document received to determine whether the received document is a modified version of the previously received document. In an embodiment, the version of the document is determined using a hash value based on the field data for the fields of the document. In another version the indexing module 140 determines whether the received document is a modified version of a previously store document by attempting to retrieve a document with the same document identifier as the received document. If the indexing module 140 determines that the key-value store 155 stores a document having the same document identifier as the received document, the indexing module 140 compares the fields of the stored document with the fields of the received document to determine 420 the fields of the received document that are different from the stored version of the document. In another embodiment, the search system 100 receives a request to modify a document. The request identifies the document to be modified by specifying the document identifier. The request further specifies one or more fields of the document that need to be modified and their corresponding modified field values.

The indexing module 140 repeats the following steps 430 and 440 for each modified field and for each index. The indexing module 140 determines 430 a key-value pair based on the modified field value. The determination of the key-value pair for each index is described in connection with FIG. 3. The indexing module 140 updates 440 the key-value pair of the index based on the determined key-value pair. This process updates the indexes for modified documents efficiently. For example, conventional indexes are unable to exploit the individual differences in a modified document compared to an original document and as a result may re-index the entire index or large portions of the index even if a small portion of a document is modified.

The process illustrated in FIG. 4 performs efficient updates of the indexes based on modified documents. Accordingly, the search system 100 updates an index based on a modified document by simply updating the key-value pairs of fields that were modified. In contrast, conventional systems may rebuild an entire index if one or more documents are modified. Rebuilding an entire index can be a slow process. In particular, if documents are modified frequently, these systems either delay the index rebuilding process, thereby using outdated data in the indexes or require large amount of computing resources to update the indexes. In contrast, the disclosed embodiments efficiently update the indexes without consuming significant resources, even if documents are modified frequently.

FIG. 5 shows a flowchart of the process for executing queries using the indexes, in accordance with an embodiment. The query engine 150 receives 510 a query from a query source, for example, a client application 115 executing on a client device 110. The query requests information stored in the documents stored in the document store 145 and comprises a search criteria. The query engine 150 identifies documents that match the search criteria and extracts the requested information for providing to the query source. For example, the search criteria may specify a particular value of a field having a particular field name. Accordingly, query engine 150 identifies all documents that have a matching value of the field having the particular field name. Alternatively, the search criteria may specify a particular value of a field having a particular field name and a particular field type. Accordingly, query engine 150 identifies all documents that have a matching value of the field having the particular field name provided the field also has the particular field type.

The query parser 225 parses 520 the received query. The query parser 225 builds a data structure by parsing the query, for example, a parse tree data structure. Various modules of the query engine 150 use the data structure for processing the query. For example, the query engine 150 may use the parse tree to determine various components of the query, for example, the search criteria, the requested fields, and so on. In the query engine 150 determines a type of the query based on the information specified by the query, for example, the search criteria specified by the query and the type of information requested by the query. Examples of types of queries include: queries that request documents matching a specified search criteria based on field data, for example, a query requesting documents having a specified value of a specified type for a specified field; queries that request fields of a given document; queries that request fields of all documents that match a given search criteria; or queries that request an aggregate of a specified field of a specified field type across matching documents.

The key-expression generator 230 identifies 530 the indexes that are relevant to the query based on the type of query and builds 540 key-expressions based on the search criteria of the query. The key-expression generator 230 builds a key-expression for each type of index that may be used for efficient execution of the query. The execution engine 240 executes 550 the key-expression against the identified indexes stored in the key-value store to identify matching key-value pairs. The execution engine 240 extracts the requested information from the matching key-value pairs. The requested information may be stored as a value of the key-value pair. Alternatively, the requested information may be stored as a portion of the key. For example, if the key is generated by combining the field name, field type, and field value, and the requested information is the field value, the query engine 150 separates the different elements of the key and returns the field value.

Following are examples illustrating how the query engine 150 processes different types of queries. If the query is of a query type that requests documents having a specified value of a specified type for a specified field, the query engine 150 generates a key-expression by combining the specified field name, the specified field type, and the specified field value. The query engine 150 uses the document index to retrieve key-value pairs matching the key-expression and identifies documents corresponding to the matching key-value pairs.

If the query is of a query type that requests fields of a given document specified by a document identifier, the query engine 150 builds a key-expression that comprises the specified document identifier. The query engine 150 uses the field index to retrieve key-value pairs matching the key-expression and accesses the requested fields of the documents corresponding to the matching key-value pairs.

If query is of the query type that requests fields of all documents that match a given search criteria, the query engine 150 uses the document index to identify the documents that match the search criteria and uses the field index to fetch requested fields of each of the matching document.

If query is of the query type that requests an aggregate of a specified field of a specified field type across matching documents, the query engine 150 builds a key-expression by combining the specified field name and the specified field type. The query engine 150 uses the columnar index 260 to retrieve the key-value pairs matching the key-expression and aggregates the values of the retrieved key-value pairs.

The result aggregator 235 collects data of matching documents for sending to the query source. The query engine 150 transmits 570 the results of execution of the query to the query source.

Illustrative Example

Following examples illustrate some sample documents and indexes created using the sample documents as well as steps for querying these documents.

D1, D2, and D3 shown below are examples of documents that may be received by the search system 100 for indexing. Each document stores key-value pairs corresponding to different fields. Each document stores a field named "id" that represents an identifier of the document. The document identifiers for documents D1, D2, and D3 are assumed to be 100, 200, and 300 respectively. The identifier may be provided by the source of the document, for example, by a third party system 130 that provided the document. Alternatively, the search system 100 may generate an identifier and store it as a field of the document. Storing the document identifier with the document makes processing of the document simpler. For example, transmitting and storing the document is simplified since a single object can be used to represent the document rather than maintaining an object and a separate identifier. In other embodiments, the identifier is stored separately from the document, for example, as a column of a table.

Document D1 {id: 100,
   name: rockset,
   type: company,
   size: 12
   address: {zip: 94402, city: sanmateo}}
Document D2 {id: 200,
   name: gandhi,
   type: person,
   age: 40
   address: {zip: 94087, city: sunnnyale}}
Document D3 {id: 300,
   name: motherteresa
   type: person
   age: 61
   address: {zip 98000, city: calcutta}}

These example documents illustrate that different documents can have different fields. The document D1 stores information describing a company and has a field called "size" which stores the number of employees in that company. The documents D2 and D3 refer to two different individuals. Each of the documents D2 and D3 has a field with field name "age" that stores the value of the age of that respective individual. For example, the value of the "age" field stored in document D2 is 40 and the value of the "age" field stored in document D2 is 61. Document D1 has a field "size" that is absent in documents D2 and D3 and documents D2 and D3 have a field "age" that is absent in document D1.

The search system 100 processes these documents to extract data describing fields from the documents and generates key-value pairs for storing in the key-value store 155. The search system 100 generates keys for each key-value pair by concatenating the document index identifier string "I" with the field name, field value, and document ID. The various values representing field data are separated using a separator, for example, the character '_' as shown below. The following keys are generated from the documents D1, D2, and D3 for storing in the document index 250.

I_name_rockset_100 null
I_type_company_100 null
I_size_12_100 null
I_address_zip_94402_100 null
I_address_city_sanmateo_100 null
I_name_gandhi_200 null
I_typeperson_200 null
I_age_40_200 null
I_address_zip_94087_200 null
I_address_city_sunnyvale_200 null
I_name_motherteresa_300 null
I_type_person_300 null
I_age_61_300 null
I_address_zip_98000_300 null
I_address_city_calcutta_300 null When the search system 100 inserts these keys into the key-value store 155, the keys are sorted, for example, alphabetically, and are stored in a sorted order as follows.

I_address_city_calcutta_300 null
I_address_city_sanmateo_100 null
I_address_city_sunnyvale_200 null
I_address_zip_94087_200 null
I_address_zip_94402_100 null
I_address_zip_98000_300 null
I_age_40_200 null
I_age_61_300 null
I_name_gandhi_200 null
I_name_motherteresa_300 null
I_name_rockset_100 null
I_size_12_100 null
I_type_company_100 null
I_type_person_200 null
I_type_person_300 null The document index may be used to process a query such as "find all documents where field name is gandhi." The search system converts this query into a seek( ) operation of the key-value store 155 and then retrieves the appropriate key-value pairs using the following API calls. The seek( ) API call is provided the prefix string "I_name_gandhi" as input.

cursor=seek("I_name_gandhi")
record=cursor.get( )

The search system 100 retrieves the key-value pair "I_name_gandhi_200 null" as a result of executing these instructions. The search system 100 parses the key "I_name_gandhi_200" of the retrieved key-value pair to determine that the document ID stored in the key is 200, which matches the document D2. Accordingly, the search system 100 returns information describing the document D2 to the query source, for example, the name of the document or one or more fields of the document.

The data stored in the documents D1, D2, and D3 is added to the columnar index 260 as follows. The columnar index identifier string used is "D" and is added as a prefix to all key values of the key-value pairs added to the columnar index 160. The key of a key-value pair is generated by concatenating the columnar index identifier string "D", the field name, the document identifier and the value of the key-value pair is the field value. For example, the search system 100 generates the following key-value pairs for the three documents D1, D2, and D3, and adds the key-value pairs to the columnar index 260.

D_name_100 rockset
D_type_100 company
D_size_100 12
D_address_zip_100 94402
D_address_city_100 sanmateo
D_name_200 gandhi
D_type_200 person
D_age_200 40
D_address_zip_200 94087
D_address_city_200 sunnyvale
D_name_300 motherteresa
D_type_300 person
D_age_300 61
D_address_zip_300 98000
D_address_city_300 calcutta When the search system 100 inserts the above keys into the key-value store 155, the key-value store 155 stores them in sorted order of the keys, for example, alphabetically sorted as follows.

D_address_city_100 sanmateo
D_address_city_200 sunnyvale
D_address_city_300 calcutta
D_address_zip_100 94402
D_address_zip_200 94087
D_address_zip_300 98000
D_age_200 40
D_age_300 61
D_name_100 rockset
D_name_200 gandhi
D_name_300 motherteresa
D_size_100 12
D_type_100 company
D_type_200 person
D_type_300 person The columnar index 260 can be used to process queries that aggregate field values over a set of documents, for example, "find the average age of all users." The age field may not be present in all documents. In the above example, the age field is found in only two document D2 and D3. Due to the way the keys are generated and stored, the key-value store stores the two values of the age field next to each another in the key-value store. To execute this query, the search system executes the following instructions.

sum_age=0
counter=0
cursor=seek("D_age")
while (cursor.key( ) has a prefix of "D_age")
counter=counter+1
sum_age=sum_age+cursor.get( ).value( )
cursor.next( )
return sum_age/counter These instructions include instructions to initialize two variables, a sum_age variable representing a sum of value of age field and a counter variable representing a counter for tracking the number of iterations. The instructions further include an instruction to invoke the seek API with prefix "D_age" indicating that the cursor should be placed at the first key-value pair that has the input string "D_age" as its prefix. The instructions further include an instruction to repeat the steps of incrementing the counter, accessing the value of the age field from the next key-value pair that is accessed, adding the accessed age value to the sum_age variable, and fetching the next key value pair by moving the cursor. The instructions further include the instruction to return the ratio of the sum_age variable and the counter variable as the average age.

The fields of the document D1, D2, and D3 are also added to the field index 255 that uses the document index identifier string "S". The field index 255 is used for efficiently processing queries for accessing fields of a particular document. For example, assume that the query "find the zip code where gandhi lives" is received. The search system 100 generates keys by concatenating the document index identifier string "S", the document identifier string "S" and the field name. The search system 100 uses the field value as the value of the key-value pair. The search system stores the following key-value pairs in the field index.

S_100_name rockset
S_100_type company
S_100_size 12
S_100_address_zip 94402
S_100_address_city sanmateo
S_200_name gandhi
S_200_type person
S_200_age 40
S_200_address_zip 94087
S_200_address_city sunnyvale
S_300_name motherteresa
S_300_type person
S_300_age 61
S_300_address_zip 98000
S_300_address_city calcutta The key-value pairs are stored in the key-value store 155 in a sorted order of the keys, for example, alphabetically sorted as follows.

S_100_address_city sanmateo
S_100_address_zip 94402
S_100_name rockset
S_100_size 12
S_100_type company
S_200_address_city sunnyvale
S_200_address_zip 94087
S_200_age 40
S_200_name gandhi
S_200_type person
S_300_address_city calcutta
S_300_address_zip 98000
S_300_age 61
S_300_name motherteresa
S_300_type person The search system 100 executes the query "find the zip code where gandhi lives" in two steps. The first step finds the document identifiers of the key-value pairs where the field "name" has value "gandhi." The search system 100 uses the document index to determine that the document id where field "name" has value "gandhi" is 200. The search system 100 further constructs a query key that combines the field index identifier "S' with the document identifier 200 and the field name "address_zip" to generate the string "S_200_address_zip" and searches the key-value store 155 for this key using the field index. Accordingly, the search system 100 executes the following instructions including the seek API call to place the cursor at the first key-value pair that has a key with prefix "S_200_address_zip" followed by the instruction to get the key-value pair. The instructions may include a iterative loop to fetch multiple addresses.

cursor=seek("S_200_address_zip")
zip=cursor.get( )

The search system 100 executes these instructions to determine that the result is 98000, which is the zip code where user with name "gandhi" lives.

The documents in the above examples did not include a field type for the fields. However in other embodiments, the search system 100 processes documents including field types by incorporating field type in the keys. In these embodiments, the search system 100 process queries based on documents that have different types of values for the same field. An example of a field having different types of values is a zip code field that may have numeric value, for example, zip_code=94040 or an alphanumeric value, for example, zip_code="NW8 9EU". The search system 100 stores the type information indicating that zip_code=94040 is of type numeric, whereas zip_code="NW8 9EU" is of type alphanumeric. This allows the search system 100 to execute type independent queries as well as type specific queries.

Architecture of Computer

Figure 6:
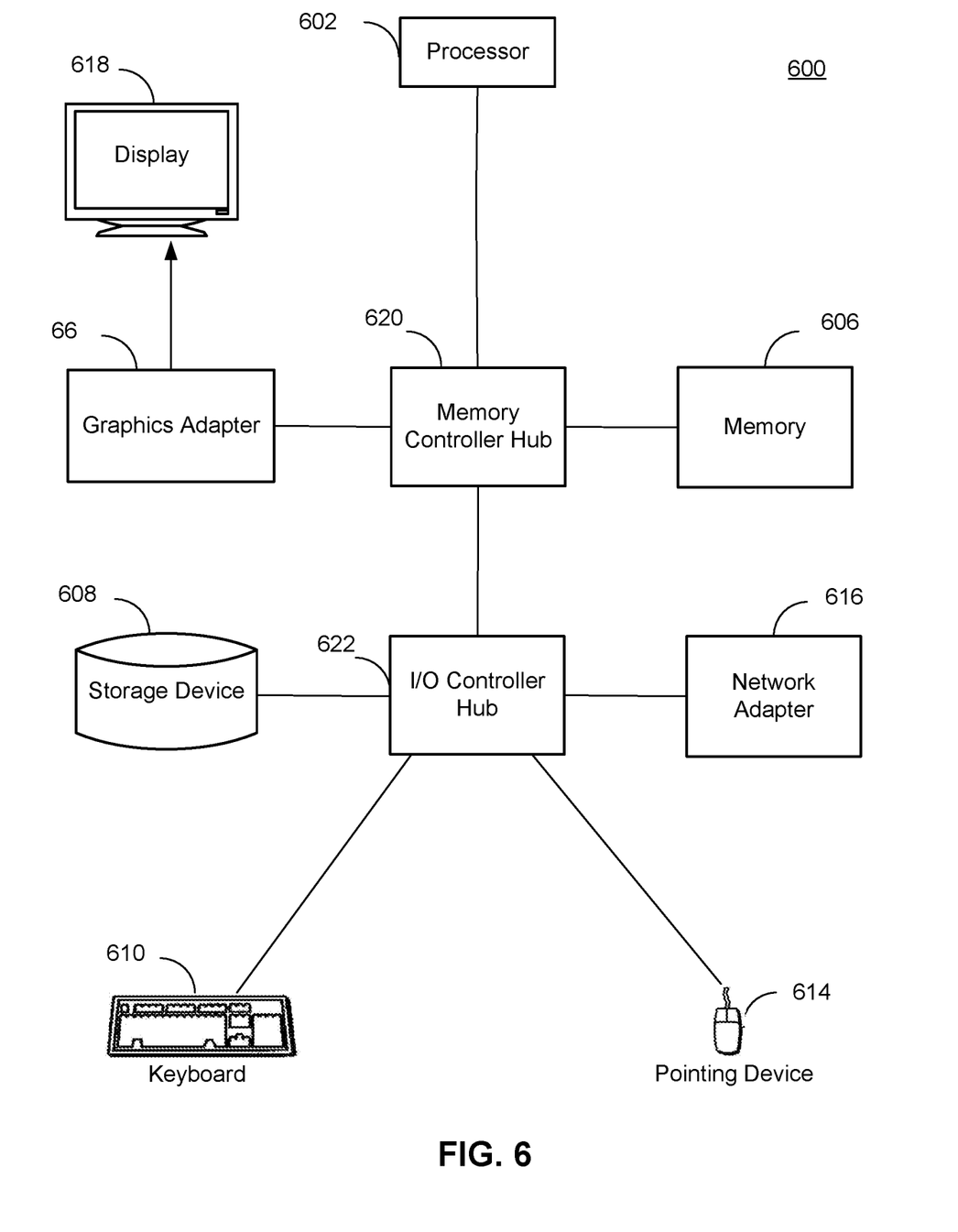
FIG. 6 shows an architecture of a computer that may be used for implementing a database system node, in accordance with an embodiment.

FIG. 6 is a high-level block diagram illustrating an example of a computer 600 for use as one or more of the entities illustrated in FIG. 1, according to one embodiment. Illustrated are at least one processor 602 coupled to a memory controller hub 620, which is also coupled to an input/output (I/O) controller hub 622. A memory 606 and a graphics adapter 612 are coupled to the memory controller hub 622, and a display device 618 is coupled to the graphics adapter 612. A storage device 608, keyboard 610, pointing device 614, and network adapter 616 are coupled to the I/O controller hub. The storage device may represent a network-attached disk, local and remote RAID, or a SAN (storage area network). A storage device 608, keyboard 610, pointing device 614, and network adapter 616 are coupled to the I/O controller hub 622. Other embodiments of the computer 600 have different architectures. For example, the memory is directly coupled to the processor in some embodiments, and there are multiple different levels of memory coupled to different components in other embodiments. Some embodiments also include multiple processors that are coupled to each other or via a memory controller hub.

The storage device 608 includes one or more non-transitory computer-readable storage media such as one or more hard drives, compact disk read-only memory (CD-ROM), DVD, or one or more solid-state memory devices. The memory holds instructions and data used by the processor 602. The pointing device 614 is used in combination with the keyboard to input data into the computer 600. The graphics adapter 612 displays images and other information on the display device 618. In some embodiments, the display device includes a touch screen capability for receiving user input and selections. One or more network adapters 616 couple the computer 600 to a network. Some embodiments of the computer have different and/or other components than those shown in FIG. 6. For example, the database system can be comprised of one or more servers that lack a display device, keyboard, pointing device, and other components, while a client device acting as a requester can be a server, a workstation, a notebook or desktop computer, a tablet computer, an embedded device, or a handheld device or mobile phone, or another type of computing device. The requester to the database system also can be another process or program on the same computer on which the database system operates.

The computer 600 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device, loaded into the memory, and executed by the processor.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method for processing queries based on documents, the method comprising:
    storing a plurality of indexes based on documents, each document having a document identifier and comprising fields, wherein each field has field data comprising one or more of: a field name, a field value, and a field type, wherein each index comprises key-value pairs stored in a key-value store, each index associated with a respective set of attributes selected from: (1) a document identifier attribute, (2) a field name attribute, (3) a field value attribute, and (4) a field type attribute, the set of attributes combined for obtaining keys of key-value pairs of the index, the plurality of indexes comprising:
        a document index configured to identify documents matching a criteria based on fields;
        a field index configured to access fields of a given document; and
        a columnar index configured to determine aggregate values associated with fields;
    receiving, from a query source, a query requesting information stored in documents indexed using the plurality of indexes, the query specifying a search criteria;
    selecting an index from the plurality of indexes for processing the query based on a type of the query;
    generating a key-expression by combining the set of attributes corresponding to the selected index;
    accessing the requested information using the selected index, the accessing comprising identifying key-value pairs matching the generated key-expression; and
    transmitting the accessed information to the query source.

2. The computer-implemented method of claim 1, further comprising:
    receiving a document comprising one or more fields; and
    updating the plurality of indexes based on the received document, the updating comprising, storing in each index, one or more key-value pairs based on fields of the received document.

3. The computer-implemented method of claim 1, wherein updating the plurality of indexes comprises storing a key-value pair in the document index, the key-value pair comprising:
    a key obtained by combining the field name, the field type, the field value, and a document identifier identifying the document.

4. The computer-implemented method of claim 1, wherein the query requests documents having a specified value of a specified field type for a specified field name, wherein the key-expression is obtained by combining the specified field name, the specified field type, and the specified field value, wherein accessing the requested information comprises:
    identifying key-value pairs matching the key-expression using the document index; and
    identifying one or more documents corresponding to the matching key-value pairs.

5. The computer-implemented method of claim 4, wherein the plurality of indexes store fields of a first document and a second document, wherein the first document includes a field having the specified field name with the specified field type, and the second document includes a field having the specified field name and a different field type, wherein the one or more identified documents corresponding to the matching key-value pairs include the first document but exclude the second document.

6. The computer-implemented method of claim 1, wherein updating the plurality of indexes comprises, storing a key-value pair in the field index, the key-value pair comprising:
    a key obtained by combining the document identifier and the field name, and
    a value representing the field value.

7. The computer-implemented method of claim 1, wherein the query requests one or more fields of a document and the search criteria specifies a document, wherein the key-expression comprises a document identifier for the specified document, wherein accessing the requested information comprises:
    identifying key-value pairs matching the key-expression using the field index; and
    accessing one or more fields of the document from the matching key-value pairs.

8. The computer-implemented method of claim 1, wherein updating the plurality of indexes comprises, storing a key-value pair in the columnar index, the key-value pair comprising, a key obtained by combining the field name, the field type, and the document identifier, and a value representing the field value.

9. The computer-implemented method of claim 1, wherein the query requests an aggregate of a field of a specified field name having a specified field type across a set of documents, wherein the key-expression is obtained by combining the specified field name and the specified field type, wherein accessing the requested information comprises:

identifying key-value pairs matching the key-expression using the columnar index; and aggregating the values of the identified key-value pairs.

10. The computer-implemented method of claim 1, further comprising:

receiving an updated document corresponding to the received document;

identifying one or more fields of the updated document that were modified compared to the received document; and for each of the one or more identified fields, updating the key-value pairs of the key-value store corresponding to the identified field.

11. A non-transitory computer readable storage medium storing instructions that when executed by one or more computer processors, cause the one or more computer processors to performs steps comprising:

storing a plurality of indexes based on documents, each document having a document identifier and comprising fields, wherein each field has field data comprising one or more of: a field name, a field value, and a field type, wherein each index comprises key-value pairs stored in a key-value store, each index associated with a respective set of attributes selected from: (1) a document identifier attribute, (2) a field name attribute, (3) a field value attribute, and (4) a field type attribute, the set of attributes combined for obtaining keys of key-value pairs of the index, the plurality of indexes comprising:

a document index configured to identify documents matching a criteria based on fields;

a field index configured to access fields of a given document; and a columnar index configured to determine aggregate values associated with fields;

receiving, from a query source, a query requesting information stored in documents indexed using the plurality of indexes, the query specifying a search criteria;

selecting an index from the plurality of indexes for processing the query based on a type of the query;

generating a key-expression by combining the set of attributes corresponding to the selected index;

accessing the requested information using the selected index, the accessing comprising identifying key-value pairs matching the generated key-expression; and transmitting the accessed information to the query source.

12. The non-transitory computer readable storage medium of claim 11, wherein the query requests documents having a specified value of a specified field type for a specified field name, wherein the key-expression is obtained by combining the specified field name, the specified field type, and the specified field value, wherein instructions for accessing the requested information comprise instructions for:

identifying key-value pairs matching the key-expression using the document index; and identifying one or more documents corresponding to the matching key-value pairs.

13. The non-transitory computer readable storage medium of claim 11, wherein updating the plurality of indexes comprises, storing a key-value pair in the field index, the key-value pair comprising:

a key obtained by combining the document identifier and the field name, and a value representing the field value.

14. The non-transitory computer readable storage medium of claim 11, wherein the query requests one or more fields of a document and the search criteria specifies a document, wherein the key-expression comprises a document identifier for the specified document, wherein instructions for accessing the requested information comprise instructions for:

identifying key-value pairs matching the key-expression using the field index; and accessing one or more fields of the document from the matching key-value pairs.

15. The non-transitory computer readable storage medium of claim 11, wherein updating the plurality of indexes comprises, storing a key-value pair in the columnar index, the key-value pair comprising, a key obtained by combining the field name, the field type, and the document identifier, and a value representing the field value.

16. The non-transitory computer readable storage medium of claim 11, wherein the query requests an aggregate of a field of a specified field name having a specified field type across a set of documents, wherein the key-expression is obtained by combining the specified field name and the specified field type, wherein instructions for accessing the requested information comprise instructions for:

identifying key-value pairs matching the key-expression using the columnar index; and aggregating the values of the identified key-value pairs.

17. The non-transitory computer readable storage medium of claim 11, wherein the stored instructions are further for:

receiving an updated document corresponding to the received document;

identifying one or more fields of the updated document that were modified compared to the received document; and for each of the one or more identified fields, updating the key-value pairs of the key-value store corresponding to the identified field.

18. A computer system comprising:

one or more computer processors; and a non-transitory computer readable storage medium storing instructions that when executed by the one or more computer processors, cause the one or more computer processors to perform steps comprising:

storing a plurality of indexes based on documents, each document having a document identifier and comprising fields, wherein each field has field data comprising one or more of: a field name, a field value, and a field type, wherein each index comprises key-value pairs stored in a key-value store, each index associated with a respective set of attributes selected from: (1) a document identifier attribute, (2) a field name attribute, (3) a field value attribute, and (4) a field type attribute, the set of attributes combined for obtaining keys of key-value pairs of the index, the plurality of indexes comprising:

a document index configured to identify documents matching a criteria based on fields;

a field index configured to access fields of a given document; and a columnar index configured to determine aggregate values associated with fields;

receiving, from a query source, a query requesting information stored in documents indexed using the plurality of indexes, the query specifying a search criteria;

selecting an index from the plurality of indexes for processing the query based on a type of the query;

generating a key-expression by combining the set of attributes corresponding to the selected index;

accessing the requested information using the selected index, the accessing comprising identifying key-value pairs matching the generated key-expression; and transmitting the accessed information to the query source.

19. The computer system of claim 18, wherein the query requests documents having a specified value of a specified field type for a specified field name, wherein the key-expression is obtained by combining the specified field name, the specified field type, and the specified field value, wherein instructions for accessing the requested information comprise instructions for:

identifying key-value pairs matching the key-expression using the document index; and identifying one or more documents corresponding to the matching key-value pairs.

20. The computer system of claim 18, wherein the query requests one or more fields of a document and the search criteria specifies a document, wherein the key-expression comprises a document identifier for the specified document, wherein instructions for accessing the requested information comprise instructions for:

identifying key-value pairs matching the key-expression using the field index; and accessing one or more fields of the document from the matching key-value pairs.

* * * * *